(12) United States Patent
Sheng et al.

(10) Patent No.: US 11,294,548 B2
(45) Date of Patent: Apr. 5, 2022

(54) VIDEO CONTENT PLAY

(71) Applicant: BANMA ZHIXING NETWORK (HONGKONG) CO., LIMITED, Grand Cayman (KY)

(72) Inventors: Ding Sheng, Hangzhou (CN); Mian Peng, Hangzhou (CN)

(73) Assignee: BANMA ZHIXING NETWORK (HONGKONG) CO., LIMITED, Grand Cayman (KY)

( * ) Notice: Subject to any disclaimer, the term of this patent is extended or adjusted under 35 U.S.C. 154(b) by 827 days.

(21) Appl. No.: 15/063,182

(22) Filed: Mar. 7, 2016

(65) Prior Publication Data

US 2016/0266776 A1 Sep. 15, 2016

(30) Foreign Application Priority Data

Mar. 9, 2015 (CN) .............................. 201510103665

(51) Int. Cl.
*G06F 3/04842* (2022.01)
*G06F 3/0482* (2013.01)

(52) U.S. Cl.
CPC ........ *G06F 3/04842* (2013.01); *G06F 3/0482* (2013.01)

(58) Field of Classification Search
CPC ...................................................... G06F 21/10
See application file for complete search history.

(56) References Cited

U.S. PATENT DOCUMENTS

| 7,849,160 B2 | 12/2010 | Hayward |
| 7,917,591 B2 | 3/2011 | Vakkalanka |
| 8,166,399 B1 | 4/2012 | Amzallag et al. |
| 2003/0030659 A1 | 2/2003 | Wu |
| 2005/0268098 A1* | 12/2005 | Oh .......................... G06F 21/10 713/168 |

(Continued)

FOREIGN PATENT DOCUMENTS

| CN | 101926166 A | 12/2010 |
| CN | 103634686 A | 3/2014 |
| CN | 104246755 A | 12/2014 |

OTHER PUBLICATIONS

PCT Search Report and Written Opinion dated Jun. 3, 2016 for PCT Application No. PCT/US16/21233, 9 pages.

(Continued)

*Primary Examiner* — Rayeez R Chowdhury
(74) *Attorney, Agent, or Firm* — Lee & Hayes, P.C.

(57) ABSTRACT

An method for playing video contents including detecting whether or not a play condition for playing a video content corresponding to a first content block in a video display page is met. When it is detected that the play condition for playing the video content corresponding to the first content block is met, adjusting a player instance corresponding to the video display page to the first content block, and playing the video content corresponding to the first content block through the player instance. The technical solution of the present disclosure simplify a play process of playing a video content, avoid that a user browses information related to the video content after entering into a new detail page by clicking icons on the video display page one by one, and enable the user to directly watch a video content corresponding to a content block on the video display page.

15 Claims, 11 Drawing Sheets

(56) References Cited

U.S. PATENT DOCUMENTS

| | | | |
|---|---|---|---|
| 2007/0053657 A1* | 3/2007 | Hamada | G11B 27/031 386/241 |
| 2007/0146504 A1* | 6/2007 | Morimoto | H04N 21/4334 348/231.3 |
| 2008/0086688 A1* | 4/2008 | Chandratillake | G06F 16/78 715/719 |
| 2008/0111822 A1 | 5/2008 | Horowitz et al. | |
| 2008/0281689 A1 | 11/2008 | Blinnikka et al. | |
| 2008/0295022 A1 | 11/2008 | Valdes et al. | |
| 2008/0307343 A1* | 12/2008 | Robert | G06F 3/0482 715/765 |
| 2009/0080020 A1* | 3/2009 | Kitagawa | H04N 5/85 358/1.15 |
| 2009/0150784 A1* | 6/2009 | Denney | G11B 27/28 715/722 |
| 2009/0164949 A1 | 6/2009 | Henkin et al. | |
| 2010/0275221 A1 | 10/2010 | DuVall et al. | |
| 2011/0161818 A1* | 6/2011 | Viljamaa | G11B 27/28 715/720 |
| 2012/0210374 A1 | 8/2012 | Dasher et al. | |
| 2012/0215646 A1* | 8/2012 | Geer, III | G06Q 30/0241 705/14.73 |
| 2012/0311624 A1* | 12/2012 | Oskolkov | H04N 21/25858 725/25 |
| 2013/0019147 A1 | 1/2013 | Chand | |
| 2013/0132966 A1 | 5/2013 | Chanda et al. | |
| 2013/0159932 A1* | 6/2013 | Chen | G06F 3/04817 715/835 |
| 2013/0275412 A1 | 10/2013 | Kaushal et al. | |
| 2014/0143806 A1 | 5/2014 | Steinberg et al. | |
| 2014/0317638 A1* | 10/2014 | Hayes | G11B 27/005 719/318 |

OTHER PUBLICATIONS

Translation of Chinese Office Action from corresponding CN Patent Application No. 201510103665X, dated Aug. 3, 2018, 9 pages.
Translation of Chinese Search Report from corresponding CN Patent Application No. 201510103665X, dated Jul. 26, 2018, 1 page.
Translation of Chinese Office Action from corresponding CN Patent Application No. 201510103665X, dated Apr. 10, 2019, 12 pages.
Translation of Chinese Search Report from corresponding CN Patent Application No. 201510103665X, dated Mar. 29, 2019, 2 pages.

* cited by examiner

MONITOR LENGTH OF TIME OF STAY OF LOCKED FOCUS AT FIRST CONTENT BLOCK IN VIDEO DISPLAY PAGE
302

ADJUST PLAYER INSTANCE CORRESPONDING TO VIDEO DISPLAY PAGE TO FIRST CONTENT BLOCK WHEN LENGTH OF TIME OF STAY IS MONITORED TO BE OVER PRESET LENGTH OF TIME
304

DETERMINE PLAY PERMISSION OF FIRST CONTENT BLOCK
306

PLAY VIDEO CONTENT CORRESPONDING TO FIRST CONTENT BLOCK ACCORDING TO PLAY PERMISSION
308

FIG. 3

MONITOR LENGTH OF TIME OF STAY OF LOCKED FOCUS AT FIRST CONTENT BLOCK IN VIDEO DISPLAY PAGE
402

ADJUST PLAYER INSTANCE CORRESPONDING TO VIDEO DISPLAY PAGE TO FIRST CONTENT BLOCK WHEN LENGTH OF TIME OF STAY IS MONITORED TO BE OVER PRESET LENGTH OF TIME
404

PLAY VIDEO CONTENT CORRESPONDING TO FIRST CONTENT BLOCK THROUGH PLAYER INSTANCE
406

RESET PLAYER INSTANCE FROM FIRST CONTENT BLOCK TO SECOND CONTENT BLOCK, IF PLAY CONDITION THAT IS REQUIRED FOR PLAYING VIDEO CONTENT CORRESPONDING TO SECOND CONTENT BLOCK IN VIDEO DISPLAY PAGE IS DETECTED
408

PLAY VIDEO CONTENT CORRESPONDING TO SECOND CONTENT BLOCK THROUGH PLAYER INSTANCE
410

FIG. 4A

VIDEO CONTENT PLAY

CROSS REFERENCE TO RELATED PATENT APPLICATION

This application claims foreign priority to Chinese Patent Application No. 201510103665.X filed on 9 Mar. 2015, entitled "VIDEO CONTENT PLAY METHOD, APPARATUS AND TERMINAL DEVICE", which is hereby incorporated by reference in its entirety.

TECHNICAL FIELD

The present disclosure relates to the field of Internet technologies, and, more particularly, to a method, an apparatus, and a terminal device of playing video contents.

BACKGROUND

In the form of playing video contents in batches, the conventional techniques use icons of video contents to represent entries of multiple video contents on the same video display page. When it is monitored that a user clicks an icon of any video content on the video display page, a detail page related to the video content of the icon is entered, and information related to the video content (for example, a score of the video content, brief introduction of the content, length of time of play, countries or regions where play is available, and an alias for the video) is provided for the user through the detail page, so that the user may use media player related to the video content to play the video file. When the user needs to browse multiple video files on the same video display page, in order to play a video content selected by the user, a terminal device needs to monitor the user's click event via the process described above, resulting in a complicated process of playing the video content.

SUMMARY

The present disclosure provides a new technical solution, which simplifies technical problems in a process of playing video contents. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In order to achieve the aforementioned purpose, the present disclosure provides technical solutions as follows:

According to an aspect of the present disclosure, an example method for playing video contents is provided, which includes the following operations:

detecting whether or not a play condition for playing a video content corresponding to a first content block in a video display page is met;

adjusting a player instance corresponding to the video display page to the first content block when it is detected that the play condition for playing the video content corresponding to the first content block is met; and playing the video content corresponding to the first content block through the player instance.

According to an aspect of the present disclosure, an example apparatus for playing video contents is provided, which includes the following modules:

a detection module that detects whether or not a play condition for playing a video content corresponding to a first content block in a video display page is met;

a first adjustment module that, when it is detected that the play condition for playing the video content corresponding to the first content block is met, adjusting a player instance corresponding to the video display page to the first content block; and a play module that plays the video content corresponding to the first content block through the player instance adjusted by the first adjustment module.

According to an aspect of the present disclosure, an example terminal device is provided, which includes:

one or more processors; and one or more memories that stores computer-executable instructions executable by the processors;

wherein the processors detect whether or not a play condition for playing a video content corresponding to a first content block in a video display page is met; when detecting that the play condition for playing the video content corresponding to the first content block is met, adjust a player instance corresponding to the video display page to the first content block; and play the video content corresponding to the first content block through the player instance.

Thus, as shown from the technical solutions, when it is detected that a play condition for playing a video content corresponding to a first content block in a video display page is met, the video content corresponding to the first content block is played through a player instance, which simplifies a play process of playing the video content, avoids that the user has to browse information related to the video content after entering into a new detail page by clicking icons on the video display page one by one, and enables the user to directly watch a video content corresponding to a content block on the video display page, thereby saving the time cost that the user browses the video content on the video display page.

BRIEF DESCRIPTION OF THE DRAWINGS

FIG. 3 is a schematic flowchart of an example method for playing video contents according to yet another example embodiment of the present disclosure;

FIG. 4A is a schematic flowchart of an example method for playing video contents according to a further example embodiment of the present disclosure;

DETAILED DESCRIPTION

Example embodiments will be described in detail, and examples thereof are illustrated in the accompanying drawings. Within the following description relating to the accompanying drawings, unless otherwise indicated, the same numbers in different accompanying drawings represent the same or similar elements. Implementations described in the following example embodiments do not represent all the implementations consistent with the present disclosure. On the contrary, they are only examples of an apparatus and a method consistent with some aspects of the present disclosure as described in detail in the appended claims.

The terms used in the present disclosure are only intended to describe specific example embodiments, and not to limit the present disclosure. Singular forms "a/an", "said" and "the" used in the present disclosure and the appended claims are also intended to include plural forms, unless other meanings are clearly stated in the context. Also, it should be understood that the term "and/or" used herein refers to and includes any or all possible combinations of one or more listed items that are associated with each other.

It should be understood that, although the present disclosure uses the terms such as first, second and third to describe various information. However, the information shall not be limited to these terms. These terms are only used to distinguish information of the same type from each other. For example, without departing from the scope of the present disclosure, first information may also be referred to as second information, and similarly, second information may also be referred to as first information. Depending on the context, for example, the word "if" used herein may be explained as "at the time of . . . ", "when . . . ", or "in response to determination".

In the present disclosure, when the techniques of the present disclosure detect that a play condition for playing a video content corresponding to a first content block in a video display page is met, the video content corresponding to the first content block is played through a player instance. This simplifies a play process of playing the video content, avoids that the user browses information related to the video content through entering into a new detail page by clicking icons on the video display page one by one, and enables the user to directly watch a video content corresponding to a content block on the video display page, thereby saving the time cost that the user browses the video content on the video display page.

Figure 1A:
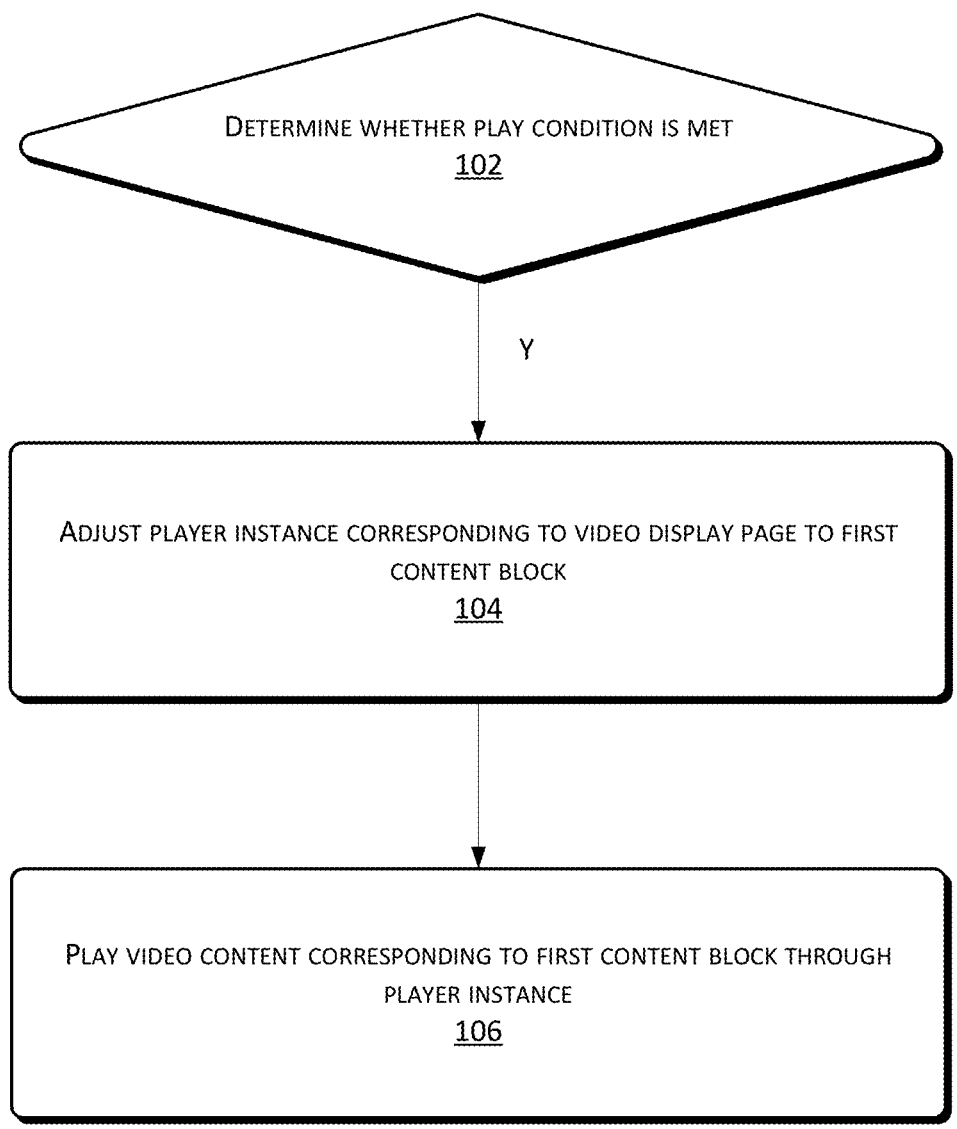
FIG. 1A is a schematic flowchart of an example method for playing video contents according to an example embodiment of the present disclosure.

To further describe the present disclosure, the following example embodiments are provided:

Referring to FIG. 1A, it is a schematic flowchart of an example method for playing video contents according to one example embodiment of the present disclosure, which is applied to a terminal device and includes operations as follows:

At 102, whether a play condition for playing a video content corresponding to a first content block in a video display page is met is determined.

In an example embodiment, when a locked focus is determined at a first content block, a play condition for playing a video content corresponding to the first content block is determined. Furthermore, in order to improve accuracy, a length of time of stay of the locked focus at the first content block is determined, and then whether or not the play condition for playing the video content corresponding to the first content block is met is determined according to whether or not the length of time of stay is over a preset length of time. In an example embodiment, when the terminal device is a smart TV, the locked focus may be a cursor displayed on the smart TV or a focus box controlled by a remote control; if the terminal device is a PC, the locked focus may be a cursor of a mouse on the PC; if the terminal device is a touch-screen device, the locked focus may be a checked box on the touch-screen device. The present disclosure does not limit specific forms of the locked focus.

At 104, when the play condition for playing the video content corresponding to the first content block is detected to be met, a player instance corresponding to the video display page is adjusted to the first content block.

In an example embodiment, for example, the preset length of time is 2 seconds, when it is determined that the length of time of stay of a cursor at the first content block is over 2 seconds, a player instance corresponding to the video display page is initiated, and a play window of the player instance is adjusted to the first content block. In an example embodiment, if a video display page has already had a corresponding player instance, the player instance corresponding to the video display page may be directly called. In another embodiment, if a player instance has not yet been created on a video display page, a player instance corresponding to the video display page is created, thereby ensuring that there is only one player on the video display page.

At 106, the video content corresponding to the first content block is played through the player instance.

In an example embodiment, at first, a video source file associated with the video content to be played by the player instance is determined, and then the video source file corresponding to the first content block is played through the player instance. In another example embodiment, at first, a play permission of the first content block is determined, and then the video content corresponding to the first content block is played according to the play permission. In another example embodiment, the video content may be a video file which is consistent with a video name displayed in the first content block, a video clip associated with the video name, and brief introduction of the content associated with the video name. By setting the video content, a user may be able to quickly browse video information on the video display page.

Figure 1B:
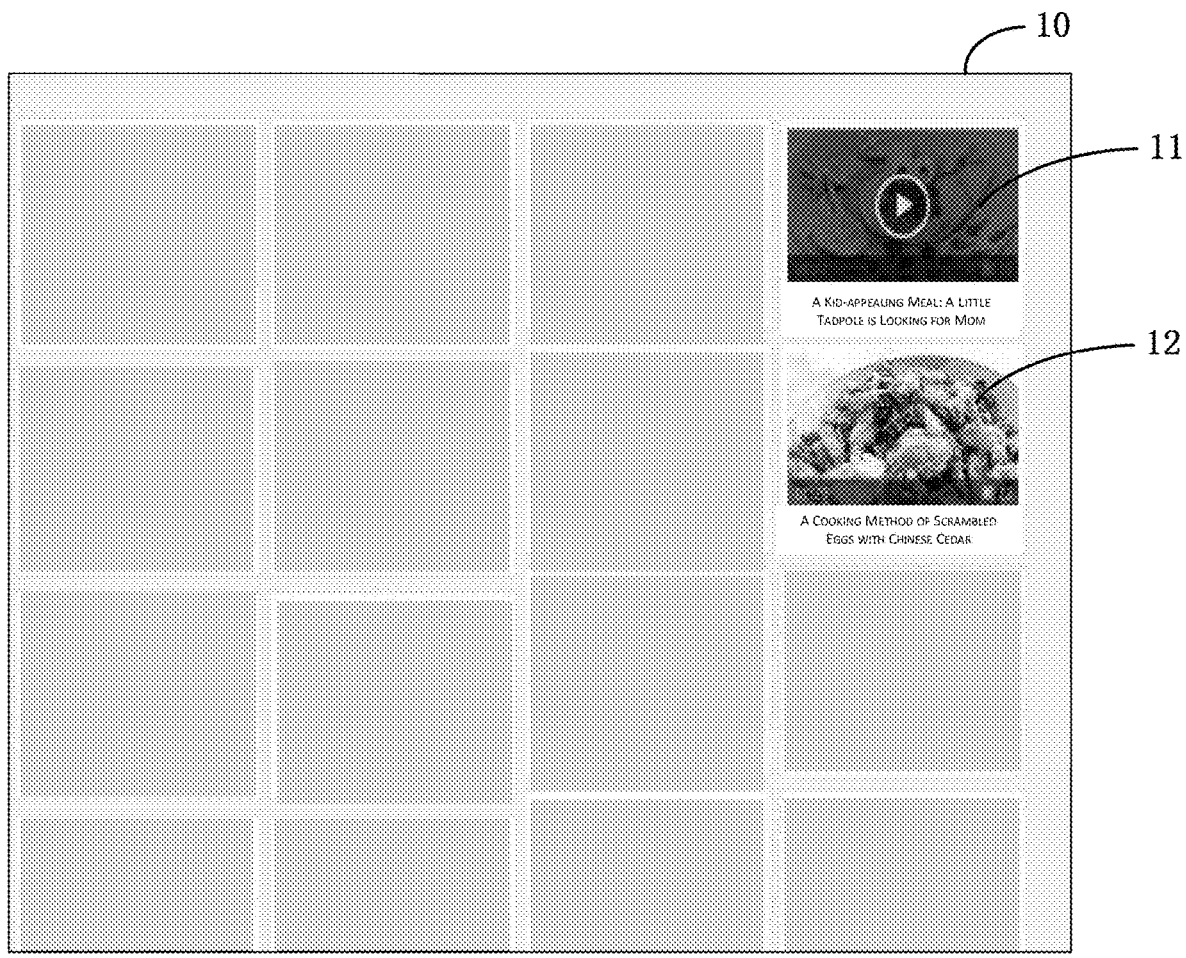
FIG. 1B is a schematic diagram of an example content block of a video display page according to one example embodiment of the present disclosure.
Figure 1C:
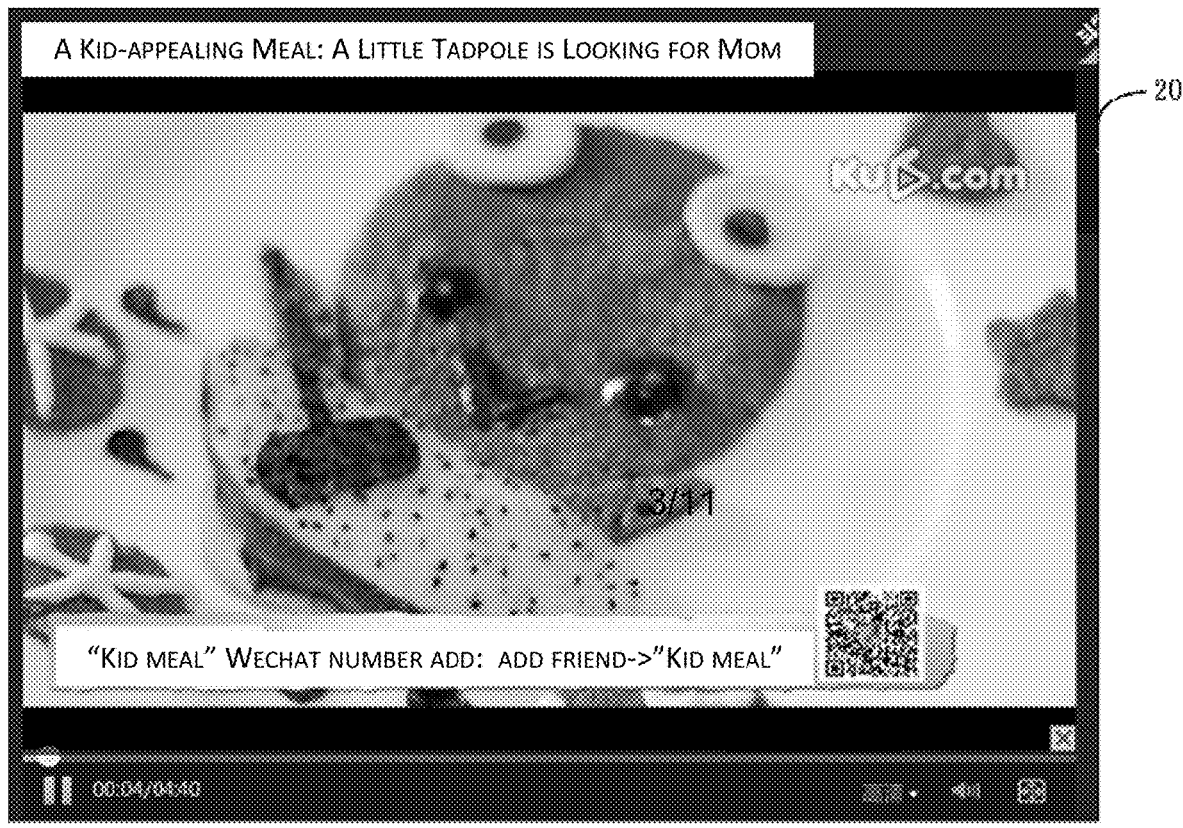
FIG. 1C is a schematic diagram of a play page in conventional techniques.

The embodiment shown in FIG. 1A is exemplarily illustrated in the following in combination with FIG. 1B and FIG. 1C. Referring to FIG. 1B, FIG. 1B is a schematic diagram of an example content block of a video display page according to one example embodiment of the present disclosure. On a video display page 10, there are multiple content blocks associated with video contents, for example, a content block 11, a content block 12 and so on; each content block corresponds to a video content available for play. For example, the content block 11 corresponds to the video content "A Kid-appealing Meal: A Little Tadpole is Looking for Mom". When a cursor stays on the content block 11, if the length of time of stay of the cursor at the content block 11 is determined to be over the preset length of time (the preset length of time may be set according to the user's usage habit, for example, the preset length of time is 2 seconds), a player instance corresponding to the video display page 10 is adjusted to the content block 11, and "A Kid-appealing Meal: A Little Tadpole is Looking for Mom" corresponding to the content block is played at the content block 11.

As shown from the above description that, through the example embodiment of the present disclosure, the video content "A Kid-appealing Meal: A Little Tadpole is Looking for Mom" corresponding to the content block 11 is played on the video display page 10 when the user selects the content block 11. According to the conventional techniques, only after a mouse click event that the mouse clicks on the content block 11 is monitored, a play page 20 of "A Kid-appealing Meal: A Little Tadpole is Looking for Mom" is accessed; as shown in FIG. 1C. When a user needs to browse the video display page 10 again, it is necessary to close the play page 20 or click back and then enter into the video display page 10 again, and when the user needs to browse video contents in batches on the video display page 10, it may take the user lots of time to perform repeated operations such as click and close. In addition, since a player, in the process of playing the video content, needs to read video stream information, decode the video stream and draw the video stream into an image, it needs to consume a large quantity of input/output (IO) and CPU resources. However, the example embodiment of the present disclosure, by instantiating a player instance in the video display page 10 and reading video resources through a player instance, avoids that too many players occupy input/output (IO), CPU and other resources of a computer, thus reducing the occupation of the CPU resources, avoiding that the video content gets stuck while being played on the video display page 10, and greatly enhancing the user's experience during browsing of the video content.

As shown from the above embodiment that, when it is detected that a play condition for playing a video content corresponding to a first content block in a video display page is met, the video content corresponding to the first content block is played through a player instance, which simplifies a play process of playing the video content, avoids that the user browses information related to the video content after entering into a new detail page by clicking icons on the video display page one by one, and enables the user to directly watch a video content corresponding to a content block on the video display page, thereby saving the time cost that the user browses the video content on the video display page.

Figure 2:
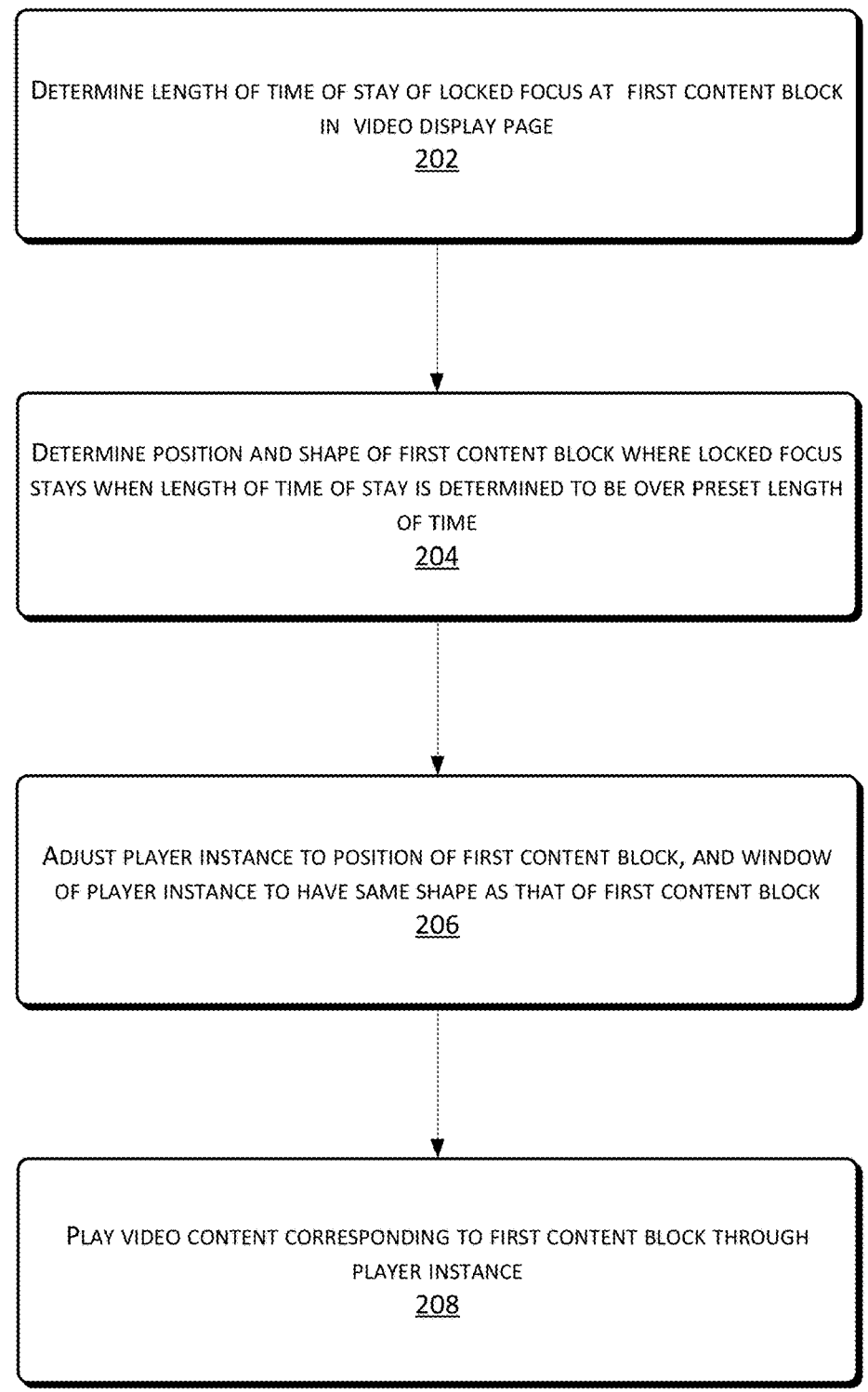
FIG. 2 is a schematic flowchart of an example method for playing video contents according to another example embodiment of the present disclosure.

Referring to FIG. 2, it is a schematic flowchart of an example method for playing video contents according to another example embodiment of the present disclosure. In this embodiment, the techniques of the present disclosure are exemplarily illustrated by using whether or not a length of time of stay of a locked focus in a video display page at a content block is over a preset length of time as a play condition and, in combination with FIG. 1B, include the following operations:

At 202, a length of time of stay of a locked focus at a first content block in a video display page is determined.

In an example embodiment, if a terminal device is a smart TV, the locked focus may be a cursor displayed on the smart TV; if the terminal device is a PC, the locked focus may be a cursor of a mouse on the PC; if the terminal device is a touch-screen device, the locked focus may be a checked box on the touch-screen device. The present disclosure does not limit the specific forms of the locked focus.

At 204, a position and a shape of the first content block where the locked focus stays are determined when the length of time of stay is determined to be over the preset length of time.

For example, the shape of the content block in FIG. 1B is a rectangle, and in another example embodiment, the shape of the content block may be a circle, an ellipse and the like, thus making the content blocks on the video display page more aesthetic, thereby further attracting a user to browse the video display page. In an example embodiment, a position where a cursor stays is achieved by monitoring the cursor. For example, when the cursor stays at the content block 11 in FIG. 1B, by comparing the position of the cursor monitored with the position of the content block 1, the cursor is determined to stay at the content block 11 shown in FIG. 1B.

At 206, a player instance is adjusted to the position of the first content block, and a window of the player instance is adjusted to have a shape same as that of the first content block.

In an example embodiment, parameter information about the shape of the first content block is firstly determined. A player instance determines a window parameter displayed by the player instance according to the parameter information of the shape of the content block. Then a window of a player is adjusted to a shape that is the same as that of the first content block, which, by adjusting the window of the player instance, enables a user to have a visual perception that the video content associated with the first content block is directly played on the first content block, and enhances the user's experience of browsing the content block on the video display page.

At 208, the video content corresponding to the first content block is played through the player instance.

The description of operations at 206 may refer to those at 106, which are not described in detail herein.

In this example embodiment, by changing the position of the window of the player instance and the shape of the window of the player, a user experience is achieved that a video content of a selected content block is played for the user, which enhances the user's experience of browsing the content block on the video display page.

Referring to FIG. 3, which is a schematic flowchart of an example method for playing video contents according to yet another example embodiment of the present disclosure, which includes the following operations:

At 302, a length of time of stay of a locked focus at a first content block in a video display page is monitored.

The descriptions of operations at 302 may refer to 102, which are not described in detail herein.

At 304, when the length of time of stay is monitored to be over a preset length of time, a player instance corresponding to the video display page is adjusted to the first content block.

The descriptions of operations at 304 may refer to 104, which are not described in detail herein.

At 306, a play permission of the first content block is determined.

In an example embodiment, the play permission of the first content block may be determined by a video file provider. For example, the play permission set by the video file provider is to play a video file that is consistent with a video name on the video display page, or, the play permission is to play a video clip associated with the video name on the video display page, or, the play permission is to play brief introduction of the content associated with the video name on the video display page, and the like.

At 308, the video content corresponding to the first content block is played according to the play permission.

In an example embodiment, the video content is a video source file. The video source file associated with the video content to be played by the player instance is determined according to the play permission, and the video source file corresponding to the first content block is played through the player instance. In another embodiment, the video content is a video clip of a video source file, and by playing the video clip on the video display page, the user may quickly understand the video content corresponding to a content block, thereby saving the time during which the user browses the video content on the video display page.

In this example embodiment, the video content is played on the video display page according to the play permission, which greatly improves flexibility of operation and promotion of a video source file provider and achieves that the user can understand the video content promoted within a shorter time.

Referring to FIG. 4A, it is a schematic flowchart of an example method for playing video contents according to a further example embodiment of the present disclosure, which includes the following operations:

At 402, a length of time of stay of a locked focus in a video display page at a first content block is monitored.

At 404, when the length of time of stay is monitored to be over preset length of time, a player instance corresponding to the video display page is adjusted to the first content block.

At 406, a video content corresponding to the first content block is played through the player instance.

The descriptions of operations from 402 to 406 may refer to 202 to 206, which are not described in detail herein.

At 408, if a play condition that is required for playing a video content corresponding to a second content block in the video display page is detected, the player instance is reset from the first content block to the second content block.

At 410, the video content corresponding to the second content block is played through the player instance.

Figure 4B:
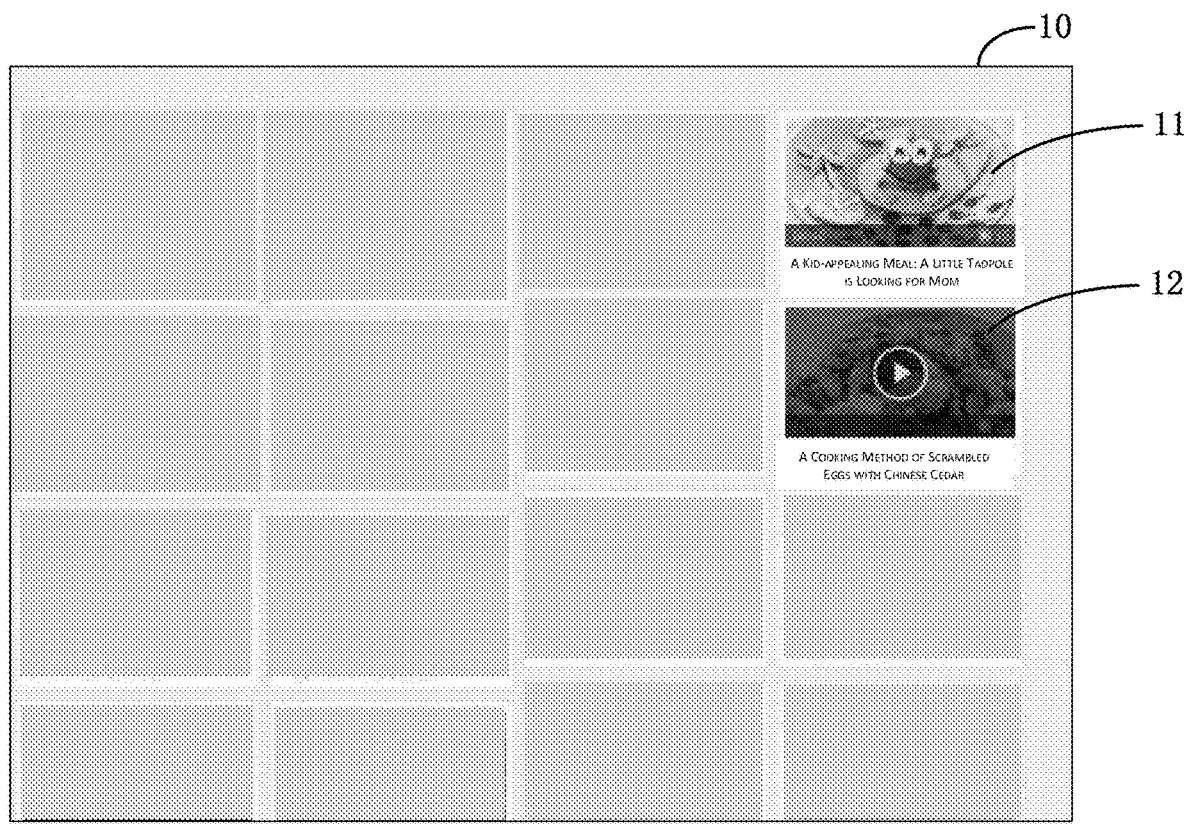
FIG. 4B is a schematic diagram of an example content block of a video display page according to another example embodiment of the present disclosure.

The example embodiment shown in FIG. 4A is exemplarily illustrated in the following in combination with FIG. 1B and FIG. 4B. Referring to FIG. 1B again, when the terminal device is a smart TV, if the user makes the cursor stay at the content block 11, through the operations from 402 to 406, at the content block 11, the video content "A Kid-appealing Meal: A Little Tadpole is Looking for Mom" corresponding to the content block 11 is directly played. In the process of playing the video content "A Kid-appealing Meal: A Little Tadpole is Looking for Mom", if it is determined that the user moves the cursor to the content block 12, and it is detected that a play condition that is required for playing a video content corresponding to the content block 12 is met, such that the length of time of stay of the cursor at the content block 12 is over the preset length of time, the player instance is reset to the content block 12 and the video content "A Cooking Method of Scrambled Eggs with Chinese Cedar" corresponding to the content block 12 is played through the player instance.

As a result, by moving the cursor on the video display page 10, the player instance achieves switching among video contents corresponding to multiple content blocks for play, thereby making it unnecessary for the user to perform multiple steps such as close and exit to browse multiple video contents, thus saving the time cost of the user.

On the basis of the above example embodiment, the method for playing video contents may further include:
monitoring a page-turning message on a control corresponding to the video display page; and
updating content blocks displayed on the video display page if the page-turning message is monitored.

By monitoring a page-turning message on a control corresponding to the video display page to update content blocks displayed on the video display page, the video display page is expanded along with its corresponding control. Thus, the techniques of the present disclosure avoid that the user browses content blocks on the next page of the video display page by clicking to turn the page, make sure that one video display page is associated with one player instance, avoid designing more player instances to be associated with more pages, saves design resources of the video display page, and also save the user's operation time.

Figure 4C:
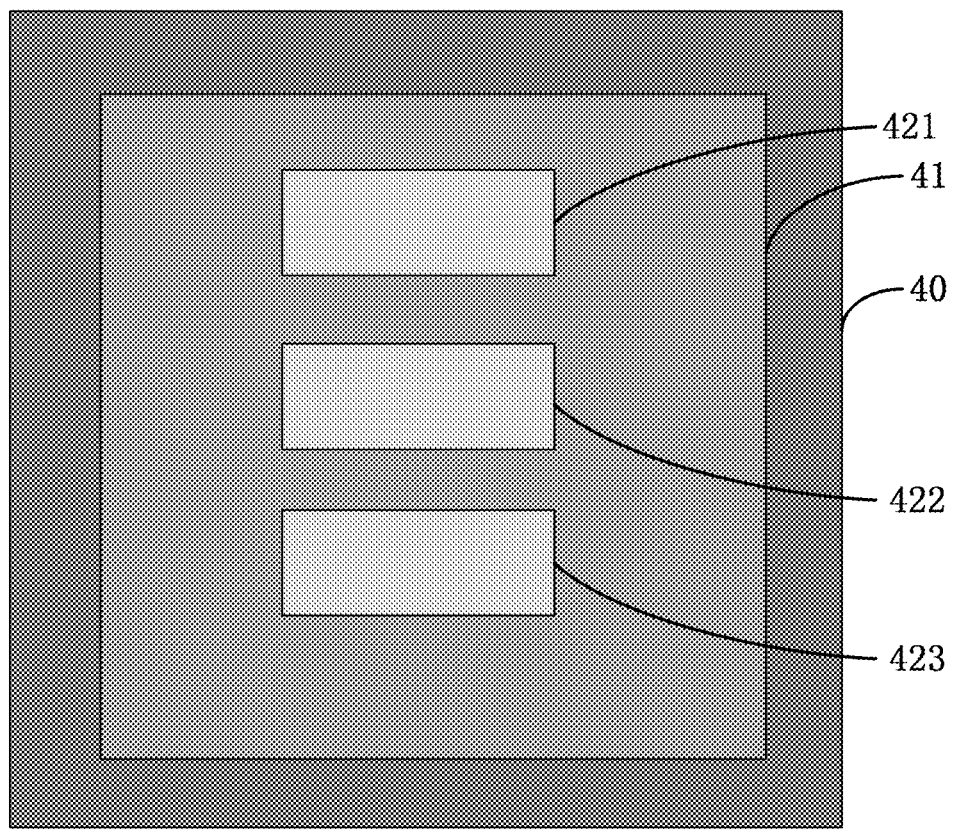
FIG. 4C is a schematic diagram of an example layout of a video display page and a control according to another example embodiment of the present disclosure.

Referring to FIG. 4C, which is a schematic diagram of layout of an example video display page and a control according to another example embodiment of the present disclosure. On a video display page 40, a control 41 corresponding to the video display page 40 is a control that may infinitely expand. A content block 421, a content block 422 and a content block 423 are located on an upper layer of space of the control 41, and a player instance is laid out on an upper layer of the control 41. Among the content block 421, the content block 422, the content block 423 and the like; when the player instance needs to play a video content corresponding to one of the content blocks (for example, the content block 421), the player instance is set on the content block 421; when it is detected that the video content corresponding to the content block 422 is required to play, the player instance is reset on the content block 422. As a result, if the content block 421 selected by the user is presented, the video content corresponding to the content block 421 is started to play, if the content block 422 is selected, the video content corresponding to the content block 422 is started to play, thereby achieving an effect of playing multiple video contents on the same video display page 40.

Figure 5:
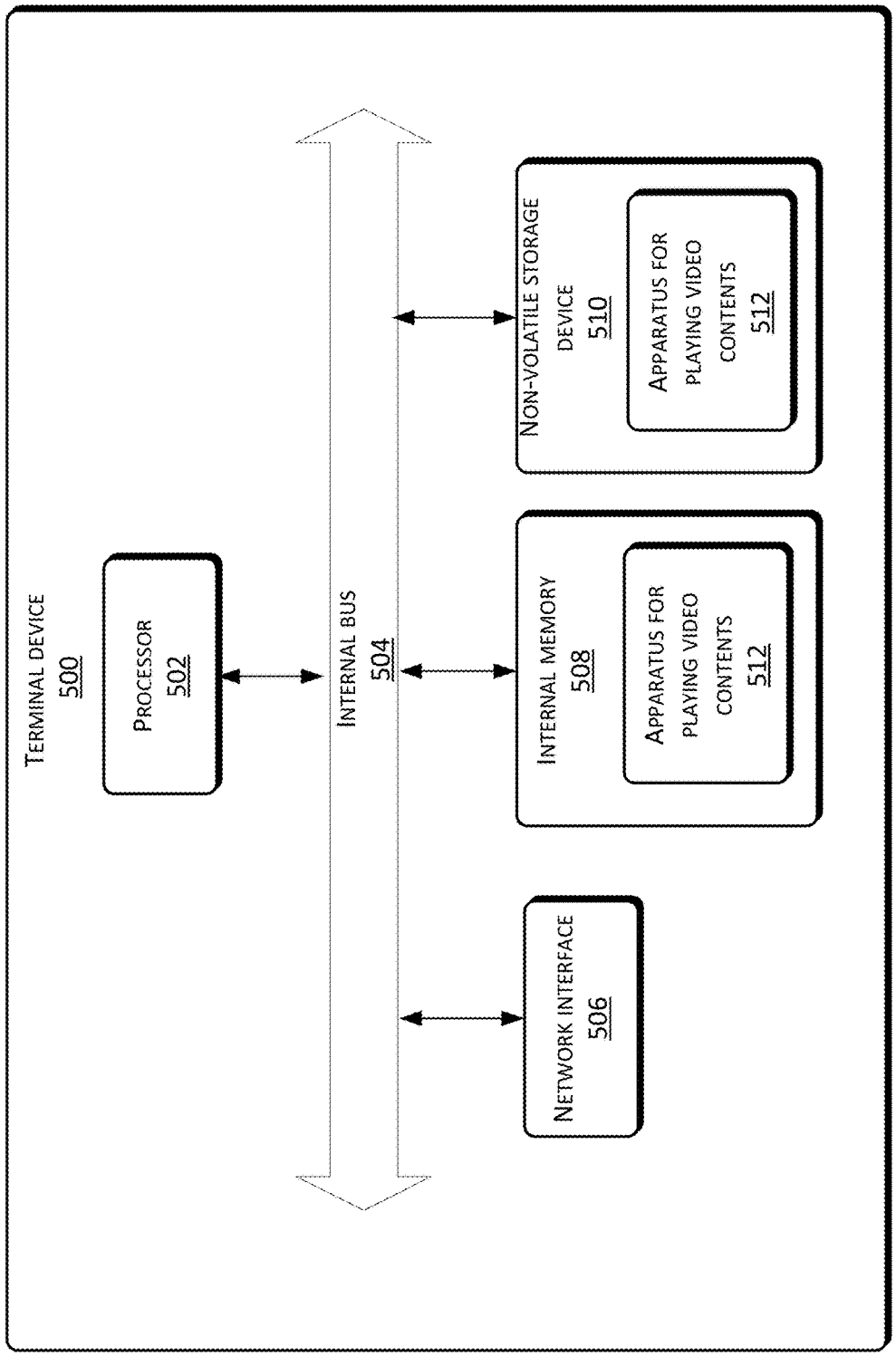
FIG. 5 is a schematic structural diagram of an example terminal device according to one example embodiment of the present disclosure.

Corresponding to the above method for playing video contents, the present disclosure also provides a schematic structural diagram of an example terminal device according to one example embodiment of the present disclosure as shown in FIG. 5. In referring to FIG. 5, at a hardware level, the terminal device 500 includes one or more processors 502 or processing units, an internal bus 504, a network interface 506, one or more internal memories 508, and one or more non-volatile storage devices 510, and certainly, may further include hardware required by other services. The processors 502 read a corresponding computer program or computer-executable instructions from the non-volatile storage devices 510 to the internal memory 508 and run the computer program, thereby forming an apparatus for playing video contents 512 on logic level. Certainly, in addition to software implementation manner, the present disclosure does not exclude other implementation manners, such as logic devices or a combination of software and hardware. In other words, execution entities of the following processing processes are not limited to various logic units, and may also be hardware or logic devices.

Figure 6:
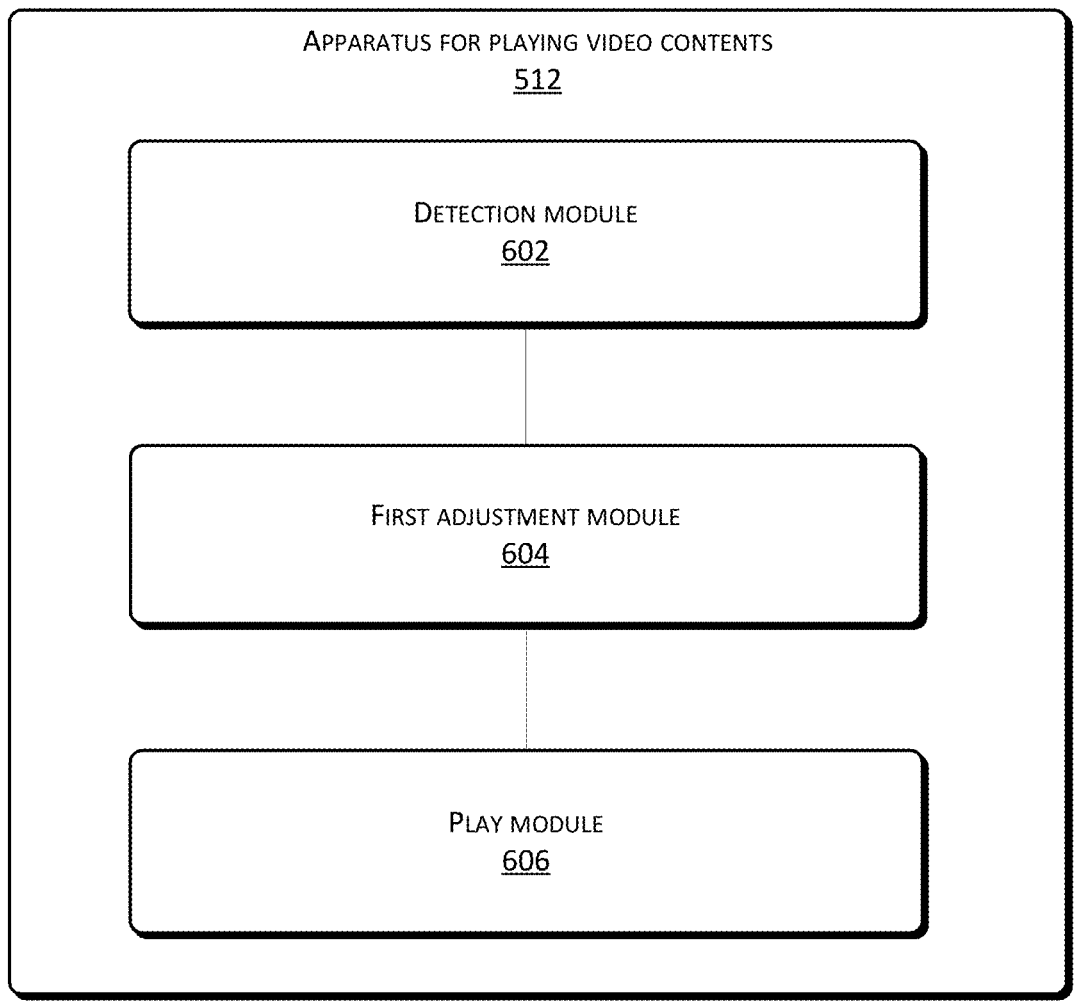
FIG. 6 is a schematic structural diagram of an example apparatus for playing video contents according to one example embodiment of the present disclosure.

Referring to FIG. 6, in an implementation mode of software, the apparatus for playing video contents 512 may include: a detection module 602, a first adjustment module 604, and a play module 606.

The detection module 602 detects whether or not a play condition for playing a video content corresponding to a first content block in a video display page is met.

The first adjustment module 604, when the detection module 602 detects that the play condition for playing the video content corresponding to the first content block is met, adjusts a player instance corresponding to the video display page to the first content block.

The play module 606 plays the video content corresponding to the first content block through the player instance adjusted by the first adjustment module 604.

Figure 7:
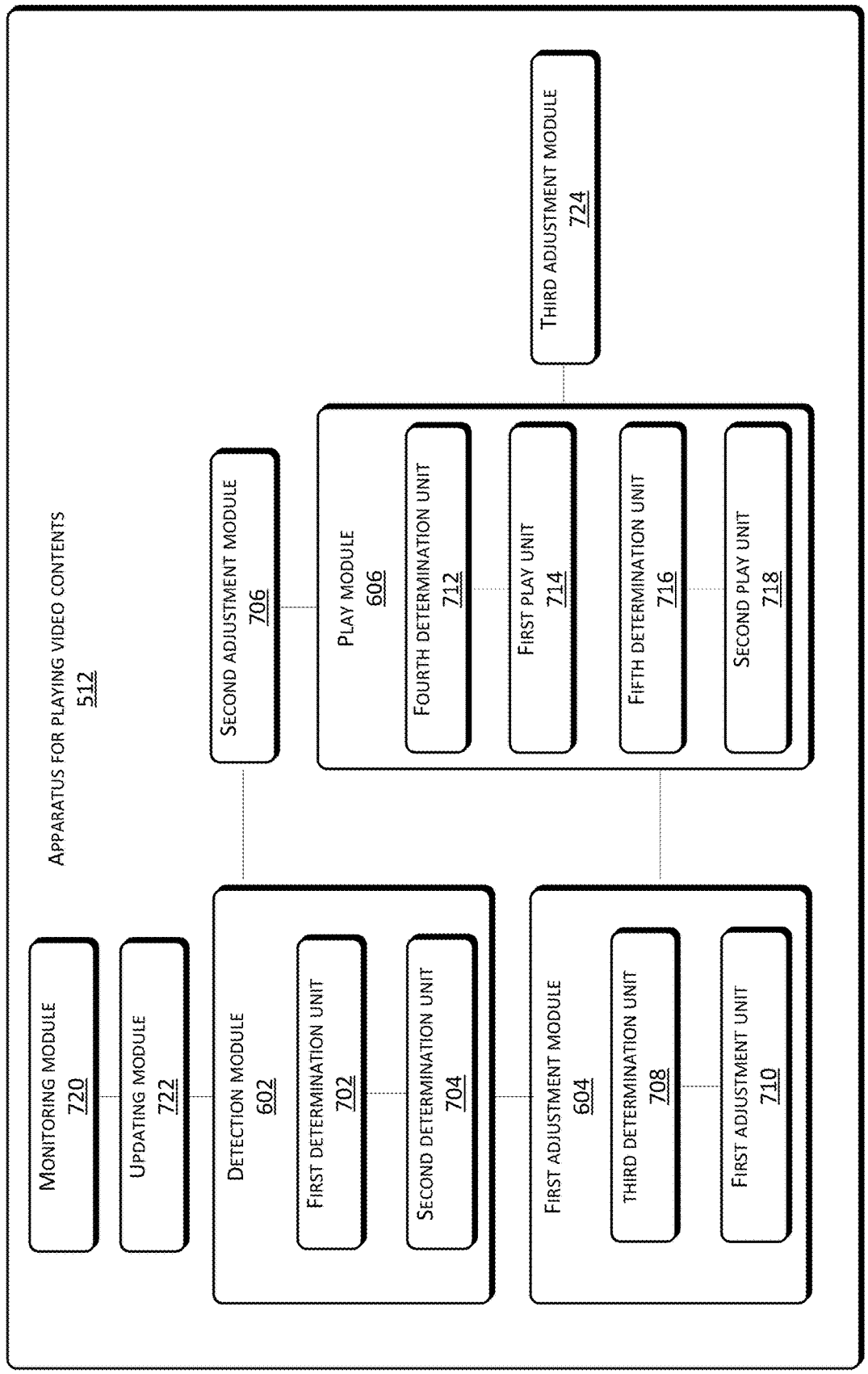
FIG. 7 is a schematic structural diagram of an example apparatus for playing video contents according to another example embodiment of the present disclosure.

Referring to FIG. 7, which is a schematic structural diagram of an example apparatus for playing video contents according to another example embodiment of the present disclosure; on the basis of the above embodiment shown in FIG. 6, the detection module 602 may include:

a first determination unit 702 that determines a length of time of stay of a locked focus in the video display page at the first content block; and a second determination unit 704 that determines whether the play condition for playing the video content corresponding to the first content block is met according to whether the length of time of stay determined by the first determination unit 702 is over preset length of time.

In an embodiment, the apparatus for playing video contents 512 may further include:

a second adjustment module 706 that, when the detection module 602 detects that the play condition for playing the video content corresponding to the first content block is met, adjusts the player instance from a hidden state to a display state.

In an example embodiment, the first adjustment module 604 may include:

a third determination unit 708 that determines a position and a shape of the first content block that are detected by the detection module 602; and a first adjustment unit 710 that adjusts the player instance to the position of the first content block that is determined by the third determination unit 708, and adjusts a window of the player instance to a shape the same as that of the first content block that is determined by the third determination unit 708.

In an embodiment, the play module 606 may include:

a fourth determination unit 712 that determines a play permission of the first content block; and a first play unit 714 that plays the video content corresponding to the first content block according to the play permission determined by the fourth determination unit 712.

In an example embodiment, the play unit 714 may include:

a determination sub-unit (not shown in FIG. 7) that determines a video source file associated with the video content to be played by the player instance according to the play permission; and a play sub-unit (not shown in FIG. 7) that plays the video source file corresponding to the first content block determined by the determination sub-unit through the player instance.

In an example embodiment, the play module 606 may include:

a fifth determination unit 716 that determines a video source file associated with the video content to be played by the player instance; and a second play unit 718 that plays the video source file corresponding to the first content block determined by the fifth determination unit 716 through the player instance.

In an example embodiment, the apparatus may further include:

a monitoring module 720 that monitors a page-turning message on a control corresponding to the video display page; and an updating module 722 that, if the monitoring module 720 monitors the page-turning message, updates content blocks displayed on the video display page, to allow the detection module 602 to detect whether or not the content blocks on the video display page updated by the updating module 722 meets a play condition.

In an example embodiment, the apparatus for playing video contents 512 may further include:

a third adjustment module 724 that, if the detection module 602 detects a play condition for playing a video content corresponding to a second content block in the video display page, resets the player instance from the first content block to the second content block; and the play module 606 plays back the video content corresponding to the second content block through the player instance.

In an example embodiment, the player instance in the present disclosure is laid out on an upper layer of a control corresponding to the video display page.

As shown from the above example embodiments, in the present disclosure, a video content corresponding to a content block, where a length of time of stay of a cursor is over preset length of time, is played through a player instance on a video display page. Thus, the techniques of the present disclosure avoid that the user browses information related to the video content after entering into a new detail page by clicking icons on the video display page one by one, and enable the user to directly watch the video content corresponding to the content block on the video display page, thereby saving the time cost that the user browses the video content on the video display page.

Those skilled in the art, after considering the specification and practicing the present disclosure, may think of other implementation schemes of the present disclosure. The present disclosure is intended to cover any variants, purposes or adaptations of the present disclosure, and these variants, purposes or adaptations follow the general principle of the present disclosure and include general knowledge or common techniques in the technical field not described in the present disclosure. The specification and embodiments described herein are only considered to be examples, and the true scope and spirit of the present disclosure are indicated by the appended claims below.

It should be further noted that the terms "include," "comprise," and any other variants thereof are intended to cover non-exclusive inclusion, so that a process, a method, a product or a device including a series of elements not only includes these elements, but also includes other elements not explicitly listed, or further includes inherent elements of the process, the method, the product or the device. Without further limitation, an element as defined by a statement "including a . . . " is not exclusive of additional identical elements in the process, the method, the product or the device including the element.

The above descriptions are only example embodiments of the present disclosure, and are not intended to limit the present disclosure. Any modification, equivalent replacement, improvement and the like made within the spirit and principle of the present disclosure should all be included in the protection scope of the present disclosure.

What is claimed is:

1. A method comprising:
improving a play process of playing a video content by:
  detecting that a play condition for playing the video content corresponding to a first content block in a video display page is met;
  instantiating a player instance corresponding to the video display page, wherein only one player instance corresponds to the video display page;
  adjusting a window of the player instance corresponding to the video display page to a position of the first content block such that the size of the window of the player instance is the same as the size of the first content block;

determining a play permission of the first content block, wherein the play permission set by a video file provider is to play a video file related to a video name on the video display page;

playing the video content corresponding to the first content block according to the play permission through the player instance at the position of the first content block;

resetting the player instance from the first content block to a second content block in response to detecting that a play condition for playing another video content corresponding to the second content block in the video display page is met;

playing the another video content corresponding to the second content block through the same player instance;

monitoring a page-turning operation on a control corresponding to the video display page, wherein the video display page is expanded along with a corresponding control; and updating one or more content blocks displayed on the video display page in response to receiving the page-turning operation.

2. The method of claim 1, wherein the detecting that the play condition for playing the video content corresponding to the first content block in the video display page is met includes:

determining a length of time of stay of a locked focus at the first content block in the video display page; and determining that the play condition for playing the video content corresponding to the first content block is met according to a determination that the length of time of stay is over a preset length of time.

3. The method of claim 1, further comprising:

adjusting the player instance from a hidden state to a display state prior to the playing the video content corresponding to the first content block through the player instance.

4. The method of claim 1, wherein the adjusting the player instance corresponding to the video display page to the position of the first content block includes:

determining a position and a shape of the first content block;

adjusting the player instance to the position of the first content block; and adjusting the window of the player instance to have a shape same as that of the first content block.

5. The method of claim 1, wherein the playing the video content corresponding to the first content block according to the play permission includes:

determining a video source file associated with the video content to be played by the player instance according to the play permission; and playing the video source file corresponding to the first content block through the player instance.

6. The method of claim 1, wherein the playing the video content corresponding to the first content block through the player instance includes:

determining a video source file associated with the video content to be played by the player instance; and playing the video source file corresponding to the first content block through the player instance.

7. A device comprising:
one or more processors; and
one or more memories stored thereon computer-executable instructions, executable by the one or more processors, to cause the one or more processors to perform acts comprising:

improving a play process of playing a video content by:

detecting that a play condition for playing the video content corresponding to a first content block in a video display page is met;

instantiating a player instance corresponding to the video display page, wherein only one player instance corresponds to the video display page;

adjusting a window of the player instance corresponding to the video display page to a position of the first content block such that the size of the window of the player instance is the same as the size of the first content block;

determining a play permission of the first content block, wherein the play permission set by a video file provider is to play a video file related to a video name on the video display page;

playing the video content corresponding to the first content block according to the play permission through the player instance at the position of the first content block;

resetting the player instance from the first content block to a second content block in response to detecting that a play condition for playing another video content corresponding to the second content block in the video display page is met;

playing the another video content corresponding to the second content block through the same player instance;

monitoring a page-turning operation on a control corresponding to the video display page, wherein the video display page is expanded along with a corresponding control; and updating one or more content blocks displayed on the video display page in response to receiving the page-turning operation.

8. The device of claim 7, wherein the detecting that the play condition for playing the video content corresponding to the first content block in the video display page is met includes:

determining a length of time of stay of a locked focus at the first content block in the video display page; and determining that the play condition for playing the video content corresponding to the first content block is met according to a determination that the length of time of stay is over a preset length of time.

9. The device of claim 7, wherein the acts further comprise:

adjusting the player instance from a hidden state to a display state prior to the playing the video content corresponding to the first content block through the player instance.

10. The device of claim 7, wherein the adjusting the player instance corresponding to the video display page to the position of the first content block includes:

determining a position and a shape of the first content block; and adjusting the player instance to the position of the first content block and the window of the player instance to have a shape same as that of the first content block.

11. The device of claim 7, wherein the playing the video content corresponding to the first content block through the player instance includes:

determining a video source file associated with the video content to be played by the player instance according to the play permission; and playing the video source file corresponding to the first content block through the player instance.

12. The device of claim 7, wherein the playing the video content corresponding to the first content block through the player instance includes:

determining a video source file associated with the video content to be played by the player instance; and playing the video source file corresponding to the first content block through the player instance.

13. One or more memories stored thereon computer-executable instructions, executable by one or more processors, to cause the one or more processors to perform acts comprising:

improving a play process of playing a video content by:

detecting that a play condition for playing the video content corresponding to a first content block in a video display page is met;

instantiating a player instance corresponding to the video display page, wherein only one player instance corresponds to the video display page;

adjusting a window of the player instance corresponding to the video display page to a position of the first content block such that the size of the window of the player instance is the same as the size of the first content block;

determining a play permission of the first content block, wherein the play permission set by a video file provider is to play a video file related to a video name on the video display page; and playing the video content corresponding to the first content block according to the play permission through the player instance at the position of the first content block;

resetting the player instance from the first content block to a second content block in response to detecting that a play condition for playing another video content corresponding to the second content block in the video display page is met;

playing the another video content corresponding to the second content block through the same player instance;

monitoring a page-turning operation on a control corresponding to the video display page, wherein the video display page is expanded along with a corresponding control; and updating one or more content blocks displayed on the video display page in response to receiving the page-turning operation.

14. The one or more memories of claim 13, wherein the detecting that the play condition for playing the video content corresponding to the first content block in the video display page is met includes:

determining a length of time of stay of a locked focus at the first content block in the video display page; and determining that the play condition for playing the video content corresponding to the first content block is met according to a determination that the length of time of stay is over a preset length of time.

15. The one or more memories of claim 13, the acts further comprising:

adjusting the player instance from a hidden state to a display state prior to the playing the video content corresponding to the first content block through the player instance.

* * * * *